United States Patent
Nomiyama

(10) Patent No.: US 11,630,610 B2
(45) Date of Patent: Apr. 18, 2023

(54) INFORMATION PROCESSING APPARATUS AND NON-TRANSITORY COMPUTER READABLE MEDIUM FOR GENERATING WEB PAGE PRINT DATA

(71) Applicant: FUJIFILM BUSINESS INNOVATION CORP., Tokyo (JP)

(72) Inventor: Hideto Nomiyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 330 days.

(21) Appl. No.: 16/824,026

(22) Filed: Mar. 19, 2020

(65) Prior Publication Data

US 2021/0026572 A1 Jan. 28, 2021

(30) Foreign Application Priority Data

Jul. 24, 2019 (JP) .............................. JP2019-135954

(51) Int. Cl.
*G06F 3/12* (2006.01)

(52) U.S. Cl.
CPC .......... *G06F 3/1204* (2013.01); *G06F 3/1254* (2013.01); *G06F 3/1255* (2013.01); *G06F 3/1287* (2013.01); *G06F 3/1289* (2013.01)

(58) Field of Classification Search
CPC .... G06F 3/1204; G06F 3/1254; G06F 3/1255; G06F 3/1287; G06F 3/1289; G06F 3/1208; G06F 3/1252; G06F 3/1256; G06F 3/1203; G06F 3/125; G06F 3/1279; G06F 3/1285

See application file for complete search history.

(56) References Cited

U.S. PATENT DOCUMENTS

| | | | | |
|---|---|---|---|---|
| 8,629,994 | B2* | 1/2014 | Yanagawa | G06F 3/1256 358/1.15 |
| 8,810,832 | B2 | 8/2014 | Fukada | |
| 2010/0014103 | A1* | 1/2010 | Lee | G06F 3/1256 358/1.15 |
| 2010/0281351 | A1* | 11/2010 | Mohammed | G06F 3/1204 715/205 |
| 2014/0204415 | A1* | 7/2014 | Sakai | G06F 3/1204 358/1.15 |
| 2015/0193674 | A1* | 7/2015 | Ishiguro | G06F 3/1253 358/1.15 |

FOREIGN PATENT DOCUMENTS

| | | |
|---|---|---|
| JP | 2011-161780 A | 8/2011 |
| JP | 2012-216196 A | 11/2012 |

\* cited by examiner

*Primary Examiner* — Juan M Guillermety
(74) *Attorney, Agent, or Firm* — Oliff PLC

(57) ABSTRACT

An information processing apparatus includes: a receiving unit that receives print setting for a Web page from an operator; a requesting unit that requests data on the Web page by transmitting terminal information set on the basis of the print setting to a Web server that provides the data on the Web page; and a generation unit that generates print data on the basis of the data on the Web page obtained from the Web server in response to a request from the requesting unit.

11 Claims, 11 Drawing Sheets

| PRINT SETTING | TERMINAL INFORMATION | |
|---|---|---|
| PAPER SIZE (WIDTH) | User-Agent | DISPLAY WIDTH |
| B3 (364 mm) | FOR PC | 1032 px |
| A3 (297 mm) | FOR TABLET TERMINAL | 842 px |
| B4 (257 mm) | | 729 px |
| A4 (210 mm) | | 595 px |
| B5 (182 mm) | | 516 px |
| A5 (148 mm) | FOR MOBILE TERMINAL | 420 px |

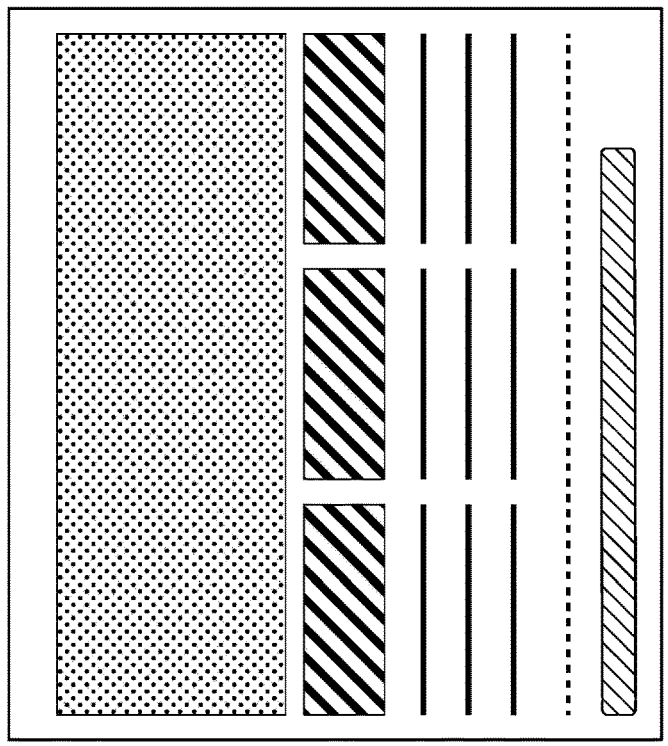
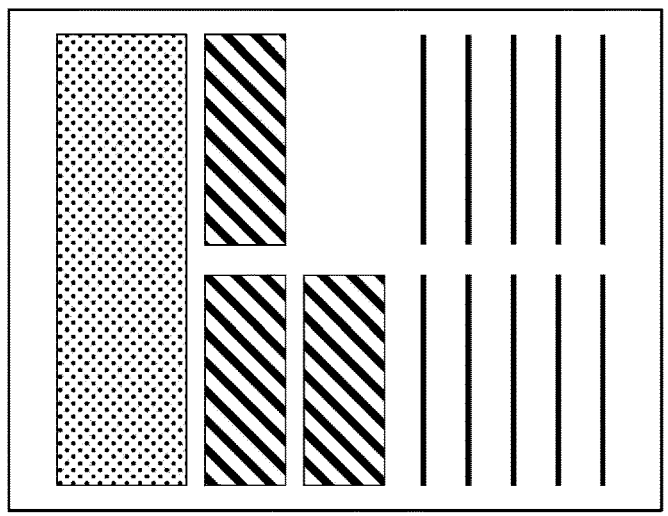
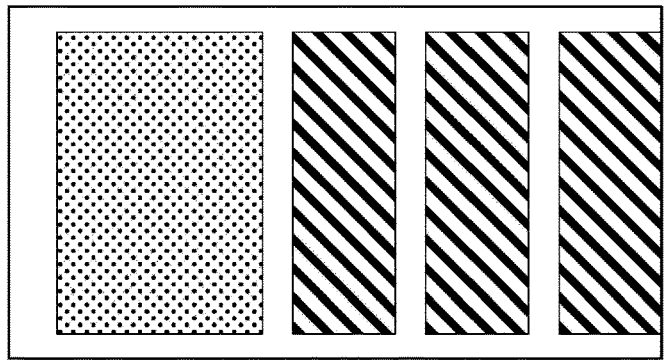

FIG. 3

| User-Agent | VALUE (IDENTIFICATION NAME) |
|---|---|
| FOR PC | Mozilla/5.0 (Windows NT x.x) |
| FOR TABLET TERMINAL | Mozilla/5.0 (Linux; Android x.x) AppleWebKit/xxx.xx (KHTML, like Gecko) Tablet |
| FOR MOBILE TERMINAL | Mozilla/5.0 (Linux; Android x.x) AppleWebKit/xxx.xx (KHTML, like Gecko) Mobile |

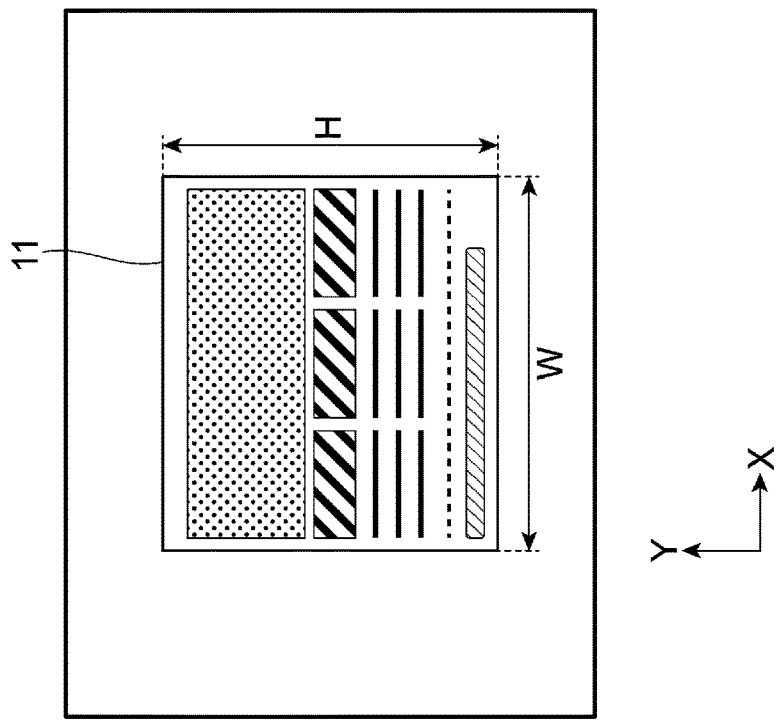
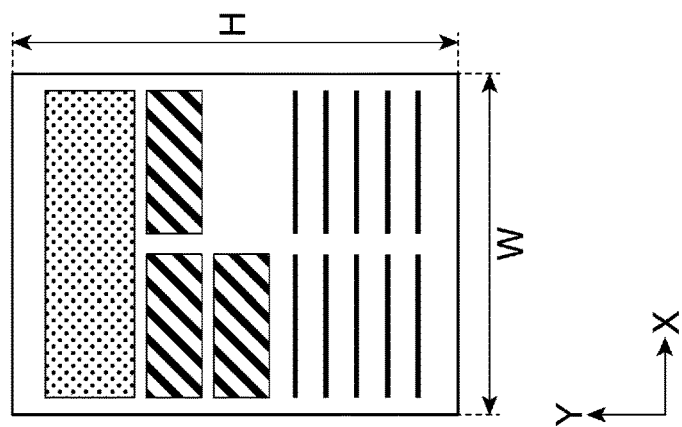
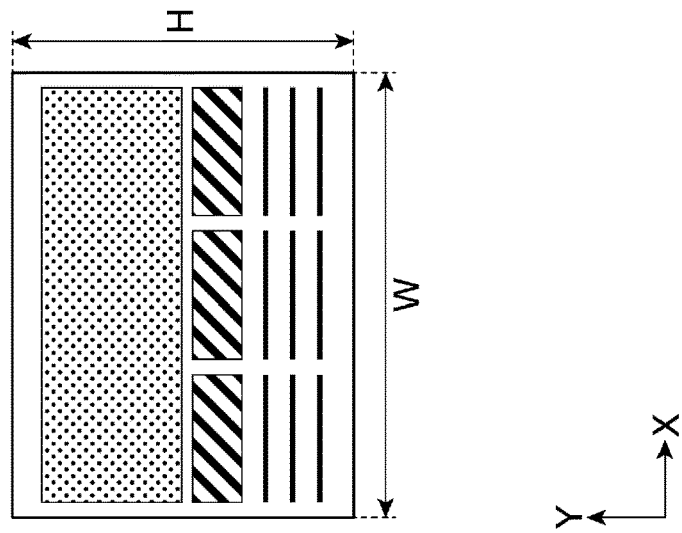

FIG. 8

| PRINT SETTING | TERMINAL INFORMATION | |
|---|---|---|
| PAPER SIZE (WIDTH) | User-Agent | DISPLAY WIDTH |
| B3 (364 mm) | FOR PC | 1032 px |
| A3 (297 mm) | FOR TABLET TERMINAL | 842 px |
| B4 (257 mm) | | 729 px |
| A4 (210 mm) | | 595 px |
| B5 (182 mm) | | 516 px |
| A5 (148 mm) | FOR MOBILE TERMINAL | 420 px |

INFORMATION PROCESSING APPARATUS AND NON-TRANSITORY COMPUTER READABLE MEDIUM FOR GENERATING WEB PAGE PRINT DATA

CROSS-REFERENCE TO RELATED APPLICATIONS

This application is based on and claims priority under 35 USC 119 from Japanese Patent Application No. 2019-135954 filed Jul. 24, 2019.

BACKGROUND

(i) Technical Field

The present disclosure relates to an information processing apparatus and a non-transitory computer readable medium.

(ii) Related Art

Japanese Unexamined Patent Application Publication No. 2011-161780 discloses an example of a technology for printing a Web page to be displayed in a different mode of display in accordance with terminal information. The document discloses an image processing apparatus connected to a portable terminal and a Web server, and includes a receiving unit that receives, from the portable terminal, specifying information which specifies how a Web page is to be printed in the case where a Web page being viewed is provided with both a portable terminal Web page and a non-portable terminal Web page, an instruction reception unit that receives, from the portable terminal, a print instruction for the portable terminal Web page acquired via the Web server, an information reception unit that receives page information including the URL of the portable terminal Web page on the basis of the received print instruction, an acquisition unit that acquires the non-portable terminal Web page corresponding to the portable terminal Web page being viewed by transmitting the page information to the Web server, and a printing unit that executes one of printing of the portable terminal Web page, printing of the non-portable terminal Web page, and printing of the portable terminal Web page and the non-portable terminal Web page on the basis of the specifying information received by the receiving unit.

SUMMARY

The mode of display of a Web page is occasionally switched in accordance with terminal information as in a method called "responsive design", for example. In such a case, a Web page is printed by acquiring data on the Web page using the same terminal information, irrespective of the print setting. Therefore, there may be a useless blank in the printed matter, the number of sheets of the printed matter may be larger than necessary, or the content of the Web page may be printed on separate pieces of the printed matter, depending on the print setting.

Aspects of non-limiting embodiments of the present disclosure relate to obtaining print data that are suitable for print setting on the basis of terminal information even in the case where a Web page whose mode of display is switched in accordance with the terminal information is to be printed compared to a case where the same terminal information is always used irrespective of the print setting.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a receiving unit that receives print setting for a Web page from an operator; a requesting unit that requests data on the Web page by transmitting terminal information set on a basis of the print setting to a Web server that provides the data on the Web page; and a generation unit that generates print data on a basis of the data on the Web page obtained from the Web server in response to a request from the requesting unit.

BRIEF DESCRIPTION OF THE DRAWINGS

An exemplary embodiment of the present disclosure will be described in detail based on the following figures, wherein:

FIGS. 2A to 2C each illustrate an example of a Web page whose mode of display is switched in accordance with terminal information;

FIG. 3 illustrates an example of a User-Agent;

FIGS. 4A to 4C each illustrate an example of a display width;

FIG. 8 illustrates an example of a correlation table;

DETAILED DESCRIPTION

An exemplary embodiment of the present disclosure will be described in detail below with reference to the accompanying drawings.

Overall Configuration of Information Processing System

Figure 1:
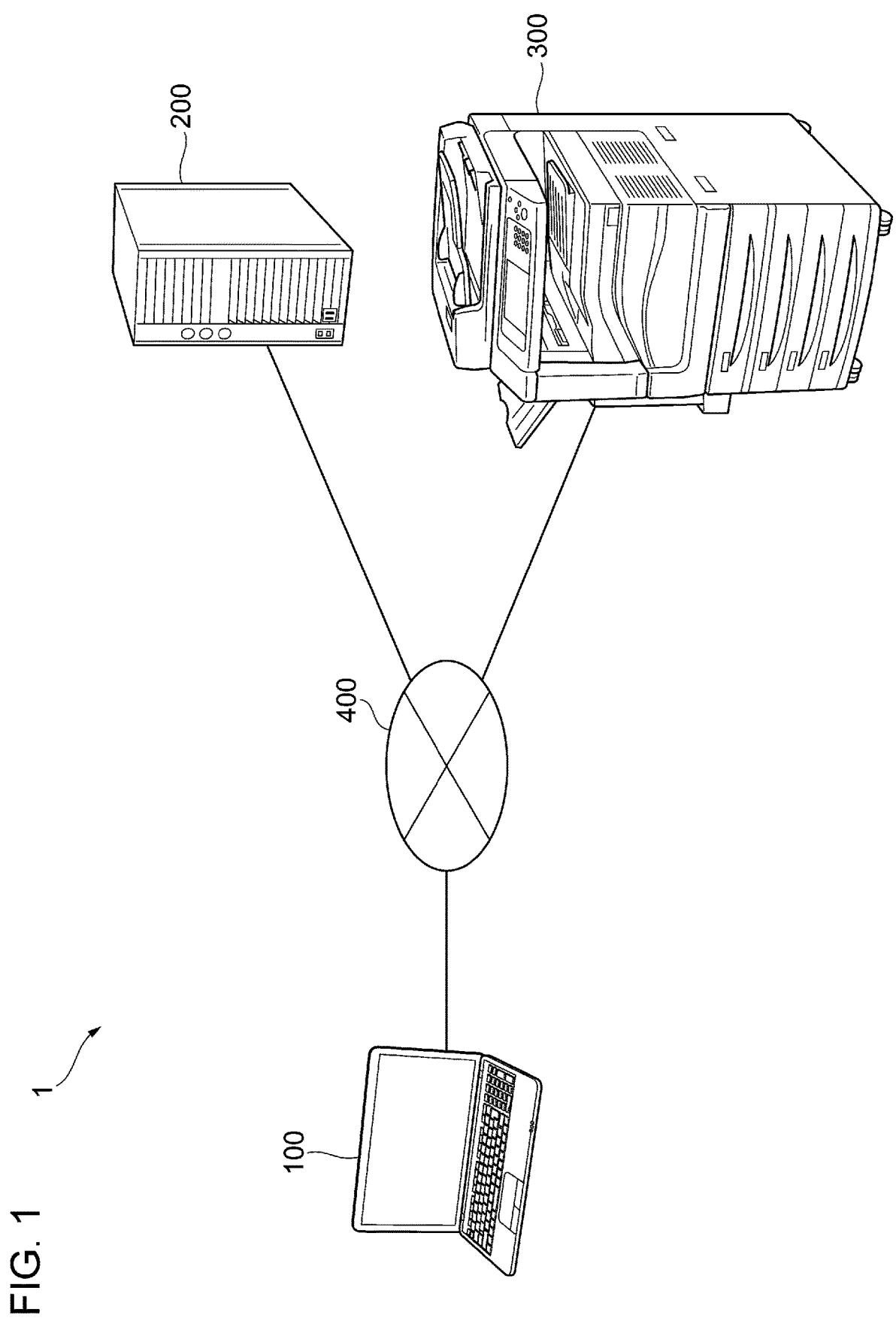
FIG. 1 illustrates an example of the overall configuration of an information processing system according to the present exemplary embodiment.

FIG. 1 illustrates an example of the overall configuration of an information processing system 1 according to the present exemplary embodiment. In the information processing system 1 according to the present exemplary embodiment, as illustrated in the drawing, a connection terminal 100, a Web server 200, and a printing device 300 are connected via a network 400.

In the present exemplary embodiment, the connection terminal 100 is used as an example of an information processing apparatus.

The connection terminal 100 is a computer device that is operable by a user. Examples of the connection terminal 100 include a personal computer (PC), a tablet terminal, and a mobile terminal (e.g. a smartphone). The PC may be a laptop PC or a desktop PC, for example. The tablet terminal may be a terminal that uses an operating system (OS) and applications that are common to smartphones and that does not have a call function, for example. The user performs an operation to display a Web page on the connection terminal 100, and performs an operation to print a Web page.

The Web server 200 is a server device that publishes a Web page, and that provides data on the Web page in response to a request from the connection terminal 100.

The printing device 300 has a print function, and performs printing by forming an image on paper as an example of a recording material.

The network 400 is a communication unit used for information communication among the connection terminal 100, the Web server 200, and the printing device 300. Examples of the network 400 include the Internet, a public line, and a local area network (LAN).

The mode of display of a Web page is occasionally switched in accordance with terminal information as in a method called "responsive design", for example. In general, the mode of display of such a Web page is defined in accordance with terminal information.

The terminal information is information that is related to a screen to display a Web page, and that indicates what screen is to display a Web page. Examples of the terminal information include information that allows estimation of the size of the screen of the terminal. More specific examples include a User-Agent and the width of a display region for displaying a Web page (hereinafter referred to as a "display width").

The User-Agent is information such as the type of the terminal, the type of an OS that is utilized, and the type of a Web browser, for example. The User-Agent is an example of the terminal information to be transmitted to the Web server 200 to request data on a Web page. On the other hand, the display width is an example of the terminal information that is not transmitted to the Web server 200 to request data on a Web page. As discussed later, the display width is used to interpret data on a Web page received from the Web server 200.

FIGS. 2A to 2C each illustrate an example of a Web page whose mode of display is switched in accordance with the terminal information. In this example, the Web server 200 has three modes of display, which are illustrated in FIGS. 2A to 2C, for the same uniform resource locator (URL). In the case where a User-Agent that indicates a mobile terminal is used, for example, a Web page in the mode of display illustrated in FIG. 2A is displayed. Meanwhile, in the case where a User-Agent that indicates a tablet terminal is used, for example, two modes of display illustrated in FIGS. 2B and 2C are switched in accordance with the display width. Further, in the case where a User-Agent that indicates a PC is used, for example, three modes of display illustrated in FIGS. 2A to 2C are switched in accordance with the display width.

The mode of display includes the layout of a Web page, for example, and specifically includes the arrangement of images and texts on a Web page.

FIG. 3 illustrates an example of the User-Agent.

In the example illustrated in FIG. 3, a User-Agent for PC, a User-Agent for tablet terminal, and a User-Agent for mobile terminal are indicated. For example, the User-Agent for PC is indicated as being used for a PC by the name of the OS "Windows NT" (registered trademark). The User-Agent for tablet terminal is indicated as being used for a tablet terminal by the name of the OS "Android" (registered trademark) and the word "Tablet". The User-Agent for mobile terminal is indicated as being used for a mobile terminal by the name of the OS "Android" and the word "Mobile". The mode of display of a Web page is switched in accordance with such terminal information.

FIGS. 4A to 4C each illustrate an example of the display width.

In the example illustrated in FIG. 4A, the connection terminal 100 is a PC, and a Web page is displayed in a display region 11 of a Web browser. The display region 11 has a width W and a height H. In this case, the width W of the display region 11 is the display width of the terminal information. Incidentally, in the case where an orthogonal coordinate system is set on the screen and the center of the screen is defined as the origin, the horizontal direction is defined as the X-axis (right-left direction in the drawing), and the vertical direction is defined as the Y-axis (up-down direction in the drawing), for example, the length of the display region 11 in the X-axis direction is the display width.

In the case where a Web page at the URL indicated in FIGS. 2A to 2C is displayed, for example, switching is performed among the three modes of display in FIGS. 2A to 2C in accordance with the width W, since the connection terminal 100 is a PC. More specifically, in the case where the Web page is displayed in the mode of display in FIG. 2A, for example, the Web page is displayed in the mode of display in FIG. 2B when the user gradually increases the width W of the display region 11, and the Web page is displayed in the mode of display in FIG. 2C when the user further increases the width W.

In the example illustrated in FIG. 4B, meanwhile, the connection terminal 100 is a tablet terminal, and a Web page is displayed on the entire screen of the tablet terminal. In this example, the width W of the screen is the display width. Incidentally, in the case where an orthogonal coordinate system is set on the screen and the center of the screen is defined as the origin, the horizontal direction is defined as the X-axis (right-left direction in the drawing), and the vertical direction is defined as the Y-axis (up-down direction in the drawing), for example, the length of the screen in the X-axis direction is the display width.

In the example illustrated in FIG. 4C, the connection terminal 100 illustrated in FIG. 4B is rotated clockwise by 90 degrees. In this case, the width W of the screen, that is, the display width is changed. Therefore, the Web page is displayed in a different mode of display from FIG. 4B.

The height (hereinafter referred to as a "display height") of the display region for displaying a Web page may be used as the terminal information. Incidentally, the display height is used as the terminal information for a Web page whose mode of display is switched in accordance with the mode of display. In the example illustrated in FIG. 4A, the height H of the display region 11 is the display height. In addition, the length of the display region 11 in the Y-axis direction is the display height. In the example illustrated in FIG. 4B, the height H of the screen is the display height. In addition, the length of the screen in the Y-axis direction is the display height. Incidentally, the display width and the display height are examples of a value that indicates the size of a display region for displaying a Web page.

In this manner, the PC, the tablet terminal, and the mobile terminal have different terminal information, and therefore the mode of display of a Web page to be displayed on a PC, the mode of display of a Web page to be displayed on a tablet terminal, and the mode of display of a Web page to be displayed on a mobile terminal may be different from each other even for a Web page at the same URL.

It should be noted, however, that these modes of display are used on the assumption that the Web page is to be displayed. Therefore, in the case where the Web page is to be printed, there may be a useless blank in the printed matter, the number of sheets of the printed matter may be larger than necessary, or the content of the Web page may be printed on separate pieces of the printed matter, depending on the print setting. Thus, the procedure for printing the Web page using the terminal information set on the basis of the print setting will be described below.

Hardware Configuration of Connection Terminal

Figure 5:
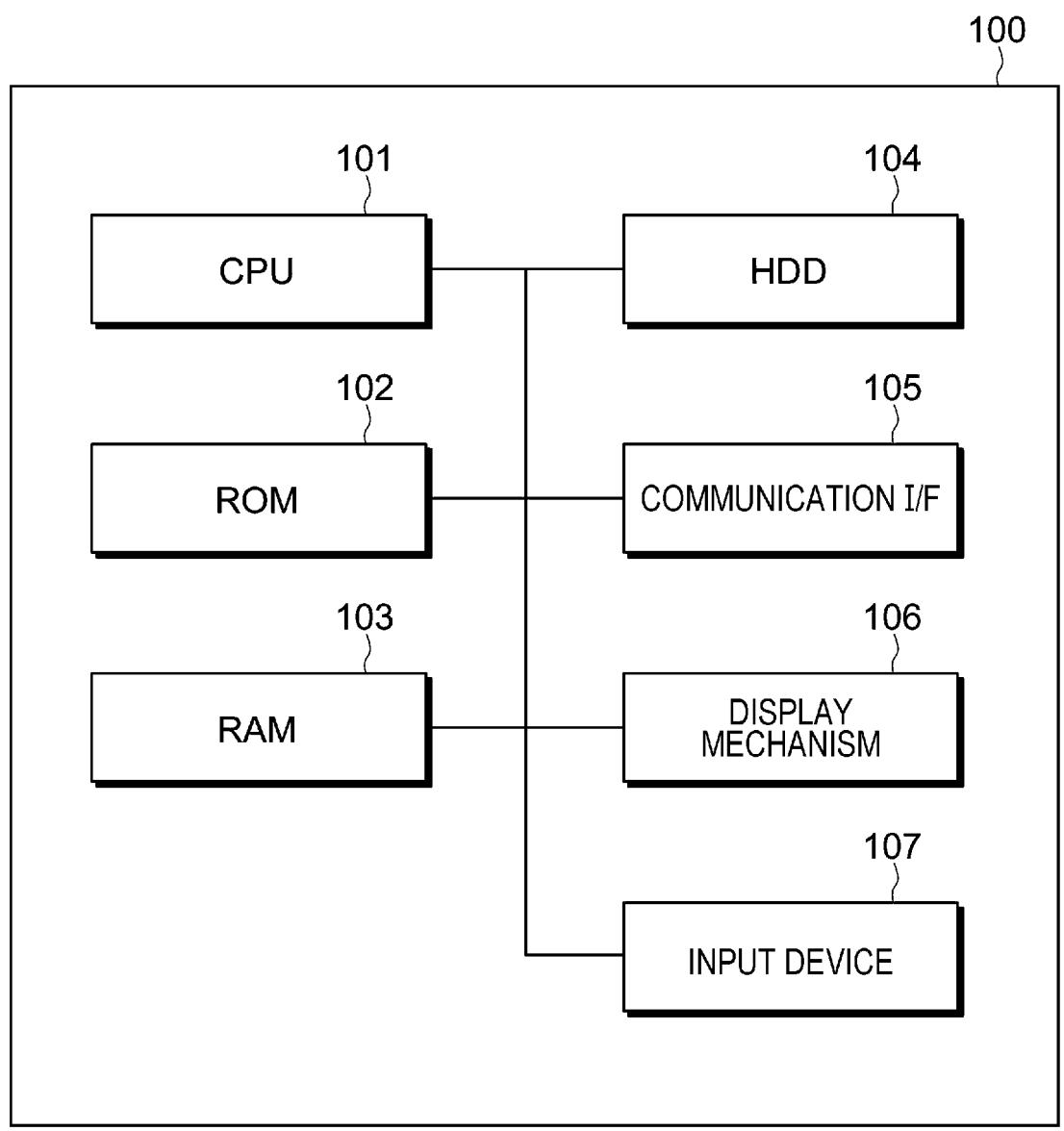
FIG. 5 illustrates an example of the hardware configuration of a connection terminal according to the present exemplary embodiment.

FIG. 5 illustrates an example of the hardware configuration of the connection terminal 100 according to the present exemplary embodiment. In the example illustrated in FIG. 5, the connection terminal 100 is a PC, by way of example.

As illustrated in the drawing, the connection terminal 100 includes a central processing unit (CPU) 101 which is a computation unit, a read only memory (ROM) 102 that serves as a storage region that stores a program such as a basic input output system (BIOS), and a random access memory (RAM) 103 that serves as an execution region for the program. The connection terminal 100 also includes a hard disk drive (HDD) 104 that serves as a storage region that stores various types of programs such as an OS and applications, input data for the various types of programs, output data from the various types of programs, etc. The various functions of the connection terminal 100 are implemented by the programs stored in the ROM 102, the HDD 104, etc. being read into the RAM 103 and executed by the CPU 101.

The connection terminal 100 further includes a communication interface (communication I/F) 105 for external communication, a display mechanism 106 such as a display, and an input device 107 such as a keyboard, a mouse, and a touch screen.

Functional Configuration of Connection Terminal

Figure 6:
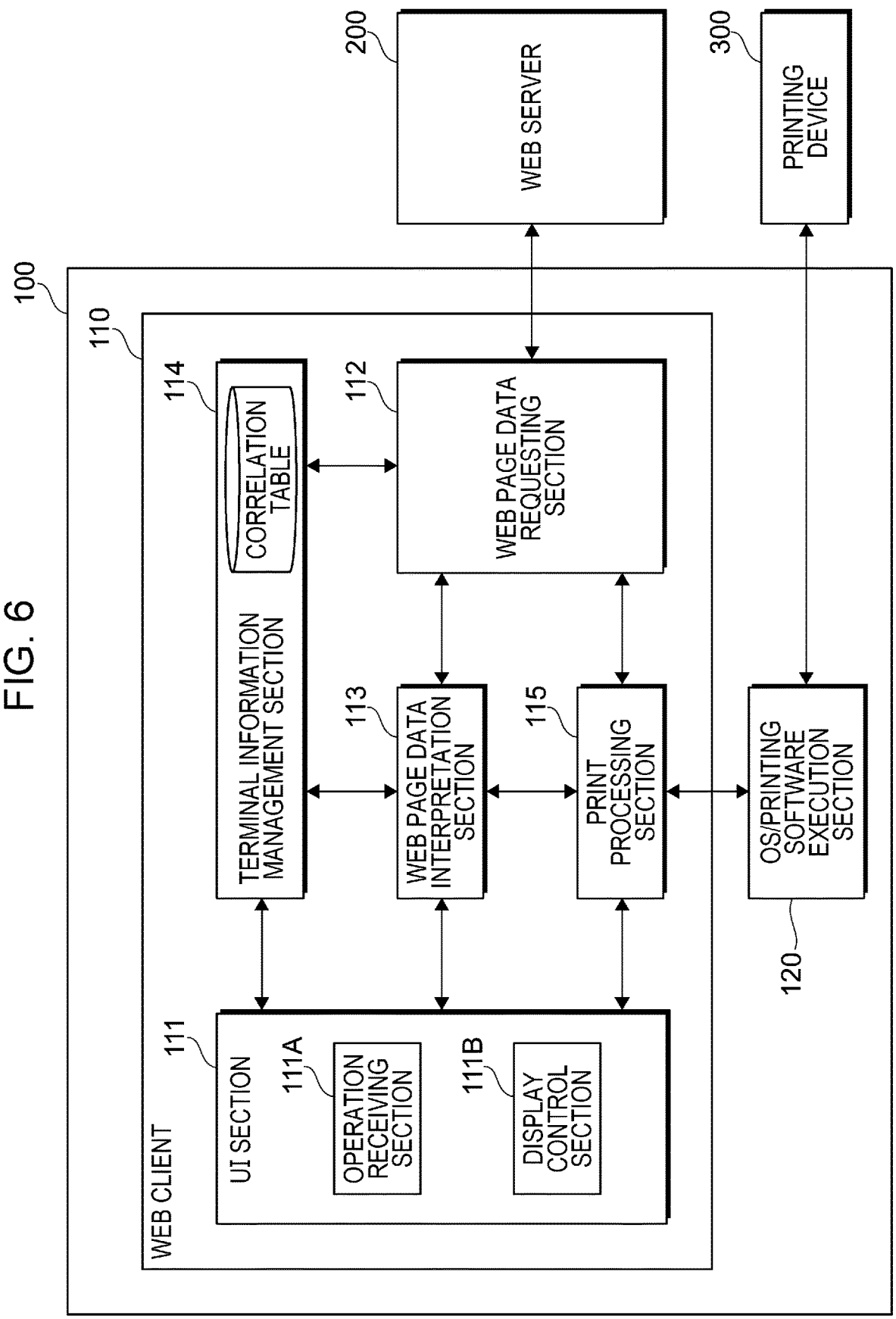
FIG. 6 is a block diagram illustrating an example of the functional configuration of the connection terminal according to the present exemplary embodiment.

FIG. 6 is a block diagram illustrating an example of the functional configuration of the connection terminal 100 according to the present exemplary embodiment. The connection terminal 100 includes a Web client 110 and an OS/printing software execution section 120.

The Web client 110 is a Web browser or a program that displays a Web page and that instructs the printing device 300 to print a Web page. The Web client 110 includes a user interface (UI) section 111, a Web page data requesting section 112, a Web page data interpretation section 113, a terminal information management section 114, and a print processing section 115.

The UI section 111, which is an example of a receiving unit, includes an operation receiving section 111A that receives an operation by the user and a display control section 111B that controls display on the display mechanism 106.

The operation receiving section 111A receives, as an operation by the user, an operation to designate a Web page to be displayed, an operation to designate a Web page to be printed, an operation to input print setting for a Web page, etc., for example.

The display control section 111B generates a control signal for controlling display on the display mechanism 106, and controls display on the display mechanism 106. For example, the display control section 111B performs control so as to display a Web page provided from the Web server 200.

The Web page data requesting section 112, which is an example of a requesting unit, requests data on a Web page from the Web server 200. The Web page data requesting section 112 requests data on a Web page designated by the user as an object to be displayed, or requests data on a Web page designated by the user as an object to be printed. The Web page data requesting section 112 also receives data on a Web page transmitted from the Web server 200 in response to a request.

Incidentally, the Web page data requesting section 112 transmits terminal information managed by the terminal information management section 114 to the Web server 200 to request data on a Web page. Examples of the terminal information to be transmitted include the User-Agent.

For example, in the case where a Web page is to be displayed, the Web page data requesting section 112 receives a User-Agent determined in advance from the terminal information management section 114, and transmits the received User-Agent to the Web server 200. The User-Agent which is determined in advance is based on the connection terminal 100. For example, in the case where the connection terminal 100 is a PC, a User-Agent for PC is transmitted to the Web server 200.

In the case where print setting is received by the UI section 111, on the other hand, the Web page data requesting section 112 receives a User-Agent corresponding to the received print setting from the terminal information management section 114, and transmits the received User-Agent to the Web server 200. The User-Agent corresponding to the print setting is a User-Agent set on the basis of the print setting.

The Web page data interpretation section 113, which is an example of a generation unit, interprets data on a Web page received from the Web server 200. Specifically, the Web page data interpretation section 113 executes a process of interpreting the language of the Web page received from the Web server 200 to process data on the Web page. Examples of the language of the Web page include HyperText Markup Language (HTML), Cascading Style Sheets (CSS), JavaScript (registered trademark), etc., for example.

Incidentally, the Web page data interpretation section 113 processes data on the Web page using terminal information managed by the terminal information management section 114. Examples of the terminal information to be used include the User-Agent and the display width.

For example, in the case where a Web page is to be displayed, the Web page data interpretation section 113 receives a User-Agent determined in advance and the display width of a display region displayed on the screen from the terminal information management section 114, and processes data on the Web page using the User-Agent and the display width which are received.

In the case where print setting is received by the UI section 111, on the other hand, the Web page data interpretation section 113 receives a User-Agent and a display width corresponding to the received print setting from the terminal information management section 114, and processes data on the Web page using the User-Agent and the display width which are received. The display width corresponding to the print setting is a display width set on the basis of the print setting, as with the User-Agent corresponding to the print setting.

The terminal information management section 114 manages terminal information, and provides the terminal information to the Web page data requesting section 112 and the Web page data interpretation section 113. The terminal information management section 114 includes a correlation table in which the print setting and the terminal information are correlated with each other, and also manages terminal information that is different from the terminal information based on the connection terminal 100.

For example, in the case where a Web page is to be displayed, the terminal information management section 114 provides terminal information determined in advance to the Web page data requesting section 112 and the Web page data interpretation section 113, irrespective of the correlation table.

In the case where print setting is received by the UI section 111, on the other hand, the terminal information management section 114 references the correlation table, and provides terminal information corresponding to the print setting which is received by the UI section 111 to the Web page data requesting section 112 and the Web page data interpretation section 113.

In the present exemplary embodiment, the correlation table is used as an example of the correlation.

The print processing section 115, which is an example of a generation unit, instructs OS/printing software to print a Web page in the case where a print instruction for the Web page is received by the UI section 111. The print processing section 115 outputs the print setting which is received by the UI section 111 and the data on the Web page which are processed by the Web page data interpretation section 113 to the OS/printing software execution section 120.

The OS/printing software execution section 120, which is an example of a generation unit, receives a print instruction from the Web client 110, and generates print data. The OS/printing software execution section 120 transmits the generated print data to the printing device 300. The printing device 300 prints a Web page using the transmitted print data.

The method for the OS/printing software execution section 120 to generate print data and the format of the print data to be generated are not limited. The method to generate print data and the format of the print data may be varied in accordance with the OS, the function of the printing software, etc.

The roles distributed to the print processing section 115 and the OS/printing software execution section 120 are not limited to those in the example discussed above. The roles distributed to the print processing section 115 and the OS/printing software execution section 120 may be varied in accordance with the OS, the function of the printing software, etc. For example, the print processing section 115 may generate and transmit print data.

Procedure of Process Performed by Connection Terminal

Figure 7:
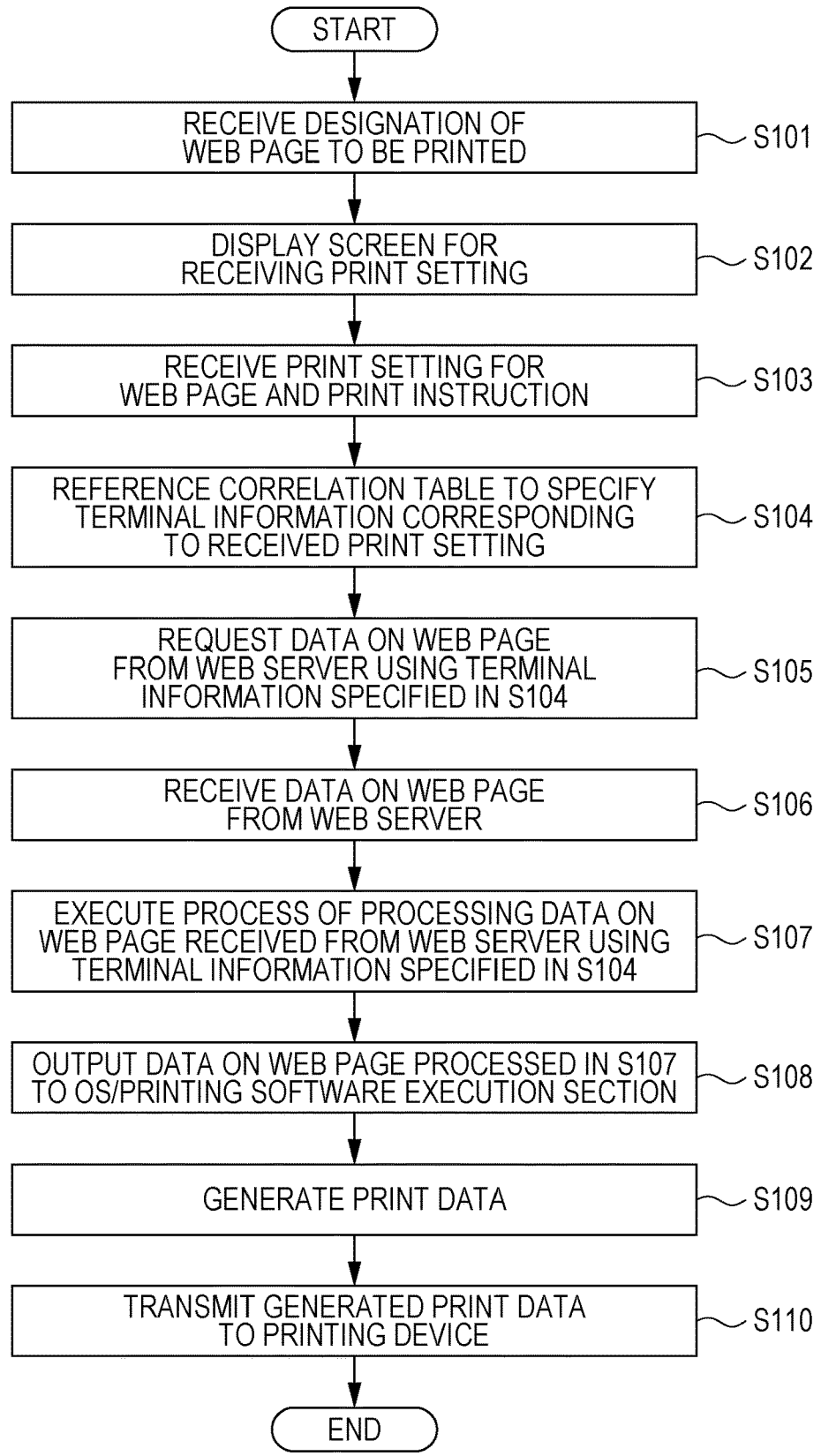
FIG. 7 is a flowchart illustrating an example of the procedure of a process performed by the connection terminal.

FIG. 7 is a flowchart illustrating an example of the procedure of a process performed by the connection terminal 100. In the example illustrated in FIG. 7, it is assumed, as an initial state, that a Web page is displayed on the display mechanism 106 by the user starting a Web browser and entering a URL.

In the following description, process steps are denoted by symbol "S".

When the user selects to print a Web page displayed on the screen, for example, the UI section 111 receives designation of a Web page to be printed (S101). Next, the UI section 111 displays a screen for receiving print setting (S102). When the user makes an input on the screen, the UI section 111 receives print setting and a print instruction for the Web page (S103). Next, the terminal information management section 114 references the correlation table, and specifies terminal information corresponding to the print setting which is received by the UI section 111 (S104). Examples of the terminal information corresponding to the print setting to be specified include a User-Agent and a display width.

Next, the Web page data requesting section 112 requests data on the Web page from the Web server 200 using the terminal information which is specified in S104 (S105). Specifically, the Web page data requesting section 112 transmits a Hypertext Transfer Protocol (HTTP) request to the Web server 200, for example. In that event, the User-Agent which is the terminal information which is specified in S104 is stored in the header portion of the HTTP request. The Web page data requesting section 112 receives data on the Web page from the Web server 200 (S106). Specifically, the Web page data requesting section 112 receives an HTTP response from the Web server 200, for example.

Next, the Web page data interpretation section 113 executes a process of processing the data on the Web page which are received from the Web server 200 using the terminal information which is specified in S104 (S107).

Specifically, the Web page data interpretation section 113 acquires HTML data and a style sheet for the Web page from the HTTP response which is received from the Web server 200, for example. The style sheet is described in a cascading style sheet (CSS) which is a style sheet language, and defines expression rules for color, font, layout, etc. In the case where a plurality of style sheets are defined in the HTTP response and switching is made among the style sheets in accordance with the display width, the Web page data interpretation section 113 acquires a style sheet corresponding to the display width which is specified in S104. In addition, there is also a case where there is a branch according to the User-Agent, the display width, etc. in the description in the HTML data and the style sheet, which are acquired, and processing is varied in accordance with the User-Agent, the display width, etc. In this case, the Web page data interpretation section 113 interprets the HTML data and the style sheet, and processes the data on the Web page, on the basis of the User-Agent, the display width, etc. which are specified in S104.

Next, the print processing section 115 provides a print instruction by outputting the data on the Web page which are processed in S107 to the OS/printing software execution section 120 (S108). Next, the OS/printing software execution section 120 generates print data by receiving the print instruction from the print processing section 115 (S109). Next, the OS/printing software execution section 120 transmits the generated print data to the printing device 300 (S110). The process flow is ended.

In the example illustrated in FIG. 7, the UI section 111 receives print setting and a print instruction in S103. However, the present disclosure is not limited to such a configuration. For example, print setting may be received and a print instruction may not be received in S103. In this case, the processes in S104 to S107 are performed when print setting is received from the user. In addition, the processes in S108 to S110 are performed when a print instruction is received from the user during the processes in S104 to S107 or after the process in S107.

In addition, a print preview that indicates how a Web page is to be printed may be displayed before the Web page is printed. In this case, the layout of the Web page to be printed using the terminal information corresponding to the print setting is displayed as a print preview.

In the example illustrated in FIG. 7, further, the Web page data requesting section 112 requests data on the Web page using the terminal information corresponding to the print setting in S105. In the case where data on the Web page which are requested have already been received, however, data on the Web page may not be requested again. For example, data on the Web page which are requested have already been received in the case where data on the Web page are requested using the User-Agent that is the same as the User-Agent which is used to display the Web page. Thus, the processes in and after S107 may be performed using the data on the Web page which have already been received.

Description of Correlation Table

Next, a correlation table of the terminal information management section 114 will be described. FIG. 8 illustrates an example of the correlation table.

In the example illustrated in FIG. 8, the "paper size" is determined as the print setting. The "paper size" is the size of paper to be used for printing. In addition, the "paper size" may also be considered as the width of paper to be used for printing. Specifically, B3, A3, B4, A4, B5, and A5 are determined as standards of paper dimensions. Such sizes of paper have a width of 364 mm, 297 mm, 257 mm, 210 mm, 182 mm, and 148 mm, respectively.

In addition, the "User-Agent" and the "display width" are determined as the terminal information. The "User-Agent" is determined to be one of "for PC", "for tablet terminal", and "for mobile terminal". Meanwhile, the "display width" is determined to be one of 1032 px (pixels), 842 px, 729 px, 595 px, 516 px, and 420 px.

Each of the plurality of print settings is correlated with the terminal information. For example, the paper size "B3" is correlated with the User-Agent "for PC" and the display width "1032 px". In addition, the paper size "A3" is correlated with the User-Agent "for tablet terminal" and the display width "842 px", for example. Further, the paper size "A5" is correlated with the User-Agent "for mobile terminal" and the display width "420 px", for example.

Incidentally, the Web server 200 normally defines the mode of display for each terminal on the assumption that a PC, a tablet terminal, and a mobile terminal have a screen whose size is sequentially smaller in this order. Thus, in the correlation table illustrated in FIG. 8, the User-Agent "for PC", the User-Agent "for tablet terminal", and the User-Agent "for mobile terminal" are arranged in the descending order of the paper size (i.e. in the descending order of the paper width) in the print setting. In addition, the display width is set to be larger as the paper size in the print setting is larger (i.e. as the paper width is larger).

In the present exemplary embodiment, the User-Agents for PC and tablet terminal are used as examples of first terminal information. In addition, the User-Agent for mobile terminal is used as an example of second terminal information.

In the correlation table illustrated in FIG. 8, a value obtained by converting the paper width into pixels (px) with 72 dots per inch (DPI) is used as the display width. In addition, the User-Agents are classified into the User-Agent "for PC", the User-Agent "for tablet terminal", and the User-Agent "for mobile terminal" at the boundaries of 480 px and 992 px. It should be noted, however, that the method to convert the display width and the method to classify the User-Agents are not limited. For example, a plurality of correlation tables may be prepared, or such methods may be changeable as desired in accordance with settings made by the user. Alternatively, the methods may be changeable in accordance with the usage of printing or the type of business of the user, for example. Specifically, a plurality of correlation tables may be prepared, and when the usage of printing or the type of business of the user is designated, a correlation table that matches the designated usage or the designated type of business may be selected to be used as the selected correlation table, for example.

Specific Example of Process Performed by Connection Terminal

Figure 9A:
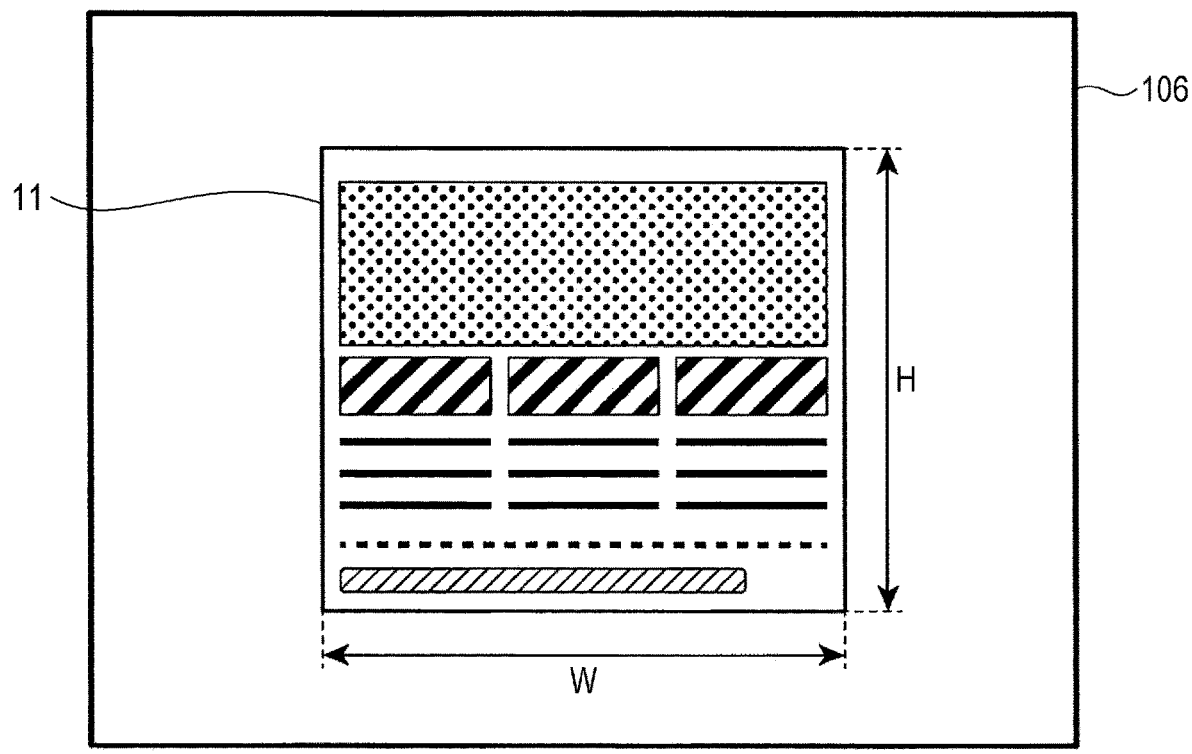
FIGS. 9A to 9C each illustrate a specific example of the process performed by the connection terminal.
Figure 9B:
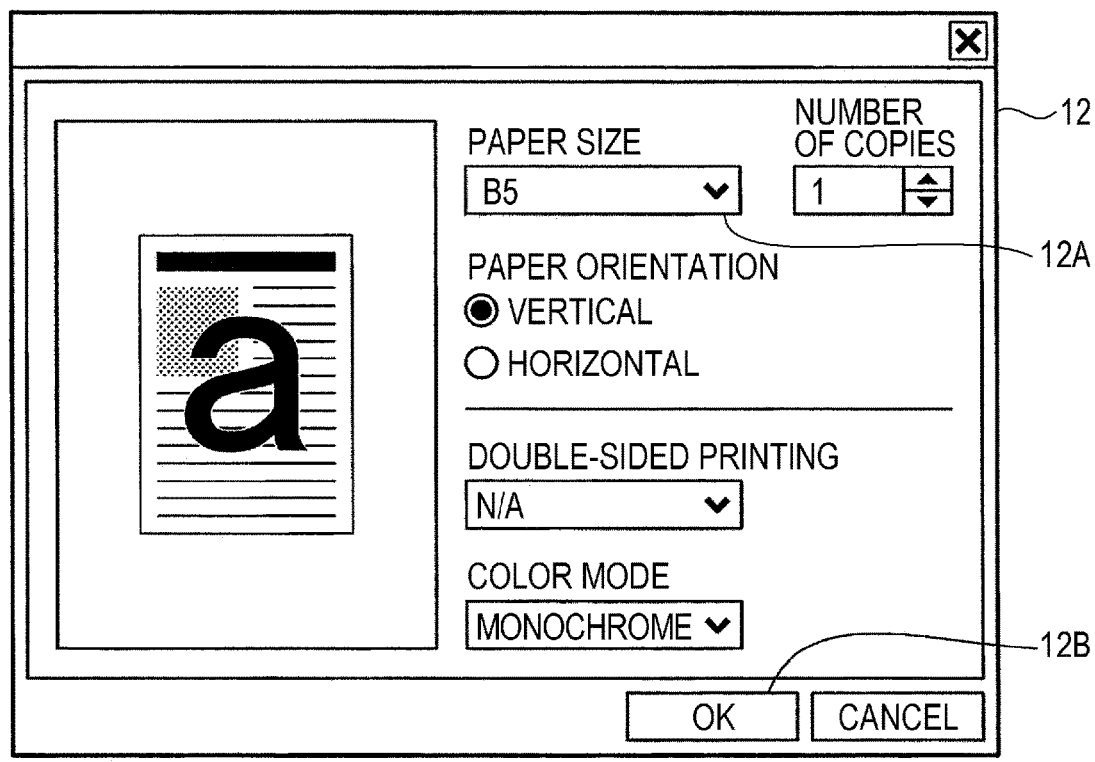
Figure 9C:
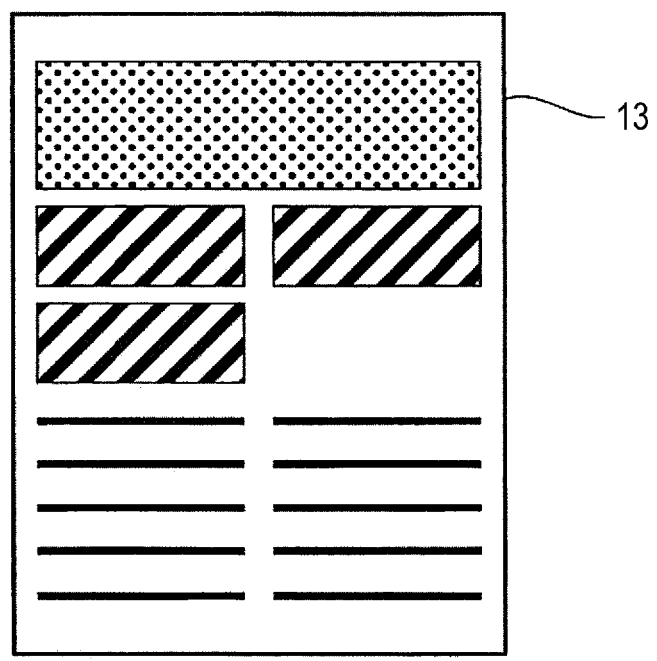

Next, the process performed by the connection terminal 100 will be described with reference to a specific example. FIGS. 9A to 9C each illustrate a specific example of the process performed by the connection terminal 100. In this example, the connection terminal 100 is a PC.

In the example illustrated in FIG. 9A, a Web page is displayed on the screen of the display mechanism 106 by the user inputting a URL. Incidentally, when the UI section 111 receives an input of a URL, the Web page data requesting section 112 requests data on a Web page from the Web server 200. Since the connection terminal 100 is a PC, the Web page data requesting section 112 transmits a User-Agent indicating that the connection terminal 100 is a PC to the Web server 200. In the example illustrated in FIG. 3, a User-Agent "for PC" is transmitted. The Web page data requesting section 112 receives data on the Web page from the Web server 200. Next, the Web page data interpretation section 113 processes the received data on the Web page. In that event, the Web page data interpretation section 113 processes the data on the Web page on the basis of the User-Agent "for PC" and the display width (in this example, the width W). The Web page is displayed in the display region 11 as illustrated in FIG. 9A.

When the user selects to print the Web page, a screen 12 for receiving print setting is displayed as illustrated in FIG. 9B. In this example, the user inputs "B5" to a field 12A for inputting the paper size. When the user selects an OK button 12B, the UI section 111 receives print setting and a print instruction for the Web page.

The paper size may be set by default. Also in the case where the paper size is set by default, the UI section 111 receives print setting and a print instruction for the Web page from the user when the user selects the OK button 12B. Alternatively, a print instruction may be received on a screen that is different from the screen 12 for receiving print setting. For example, the UI section 111 receives print setting when the user selects the OK button 12B, and the UI section 111 receives a print instruction when the user selects a print button (not illustrated) on a different screen.

Next, the terminal information management section 114 references the correlation table, and specifies terminal information corresponding to the paper size "B5". In the correlation table illustrated in FIG. 8, the User-Agent "for tablet terminal" and the display width "516 px" are specified as the terminal information. Next, the Web page data requesting section 112 requests data on the Web page by transmitting the User-Agent "for tablet terminal" to the Web server 200. Incidentally, the User-Agent "for tablet terminal" is used here while the User-Agent "for PC" is used to display a Web page.

The Web page data interpretation section 113 processes the data on the Web page received from the Web server 200. The Web page data interpretation section 113 processes the data on the Web page on the basis of the User-Agent "for tablet terminal" and the display width "516 px". Incidentally, the User-Agent "for tablet terminal" and the display width "516 px" are used here while the User-Agent "for PC" and the display width (in this example, the width W of the display region 11) are used to display the Web page. The OS/printing software execution section 120 generates print data, and transmits the generated print data to the printing device 300.

FIG. 9C illustrates an example of printed matter 13 printed by the printing device 300. Printing is performed on the basis of the mode of display for a tablet terminal and with a display width of 516 px by performing printing using the terminal information with the User-Agent "for tablet terminal" and the display width "516 px". Incidentally, the layout of the printed matter 13 illustrated in FIG. 9C is different from the mode of display of the Web page which is displayed in the display region 11 illustrated in FIG. 9A.

In this manner, the connection terminal 100 according to the present exemplary embodiment requests data on a Web page by transmitting terminal information set on the basis of the print setting to the Web server 200. In addition, the connection terminal 100 generates print data on the Web page on the basis of the data on the Web page which are obtained from the Web server 200 and the terminal information which is set on the basis of the print setting. Printing is performed using the generated print data.

Different Example of Print Setting

Figure 10A:
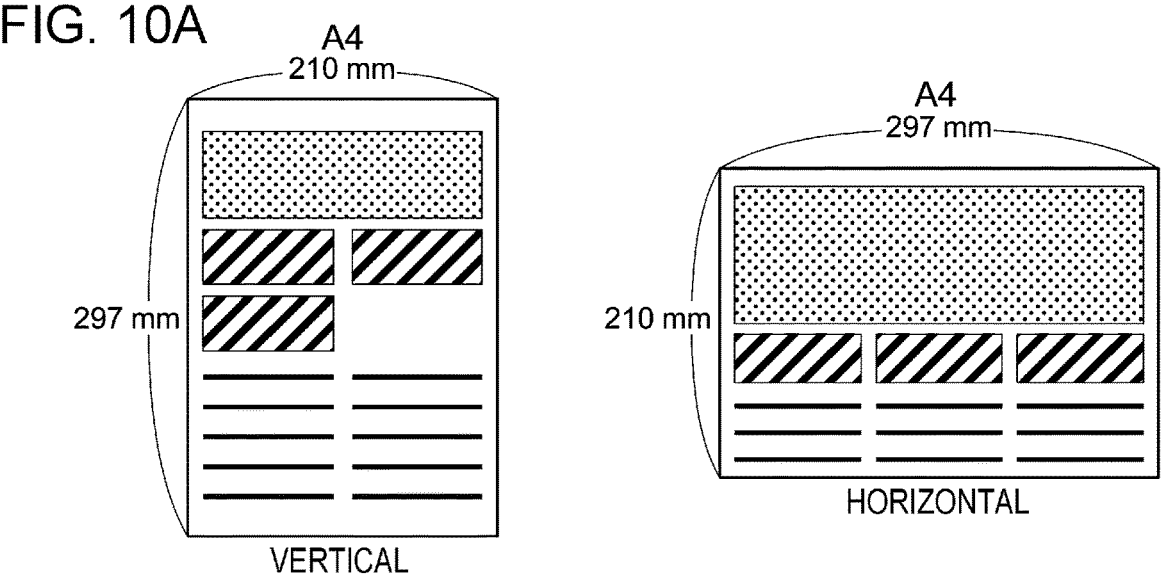
FIGS. 10A to 10C each illustrate a different example of print setting.
Figure 10B:
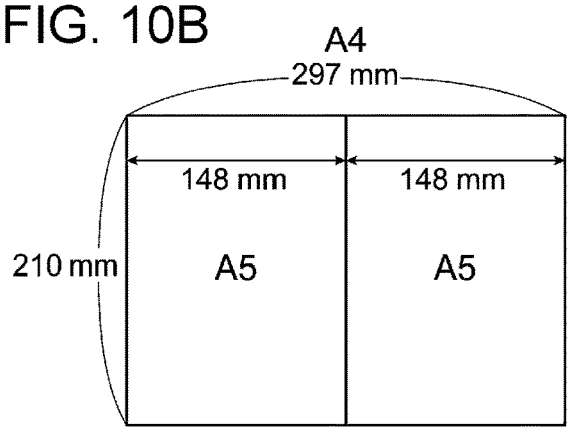
Figure 10C:
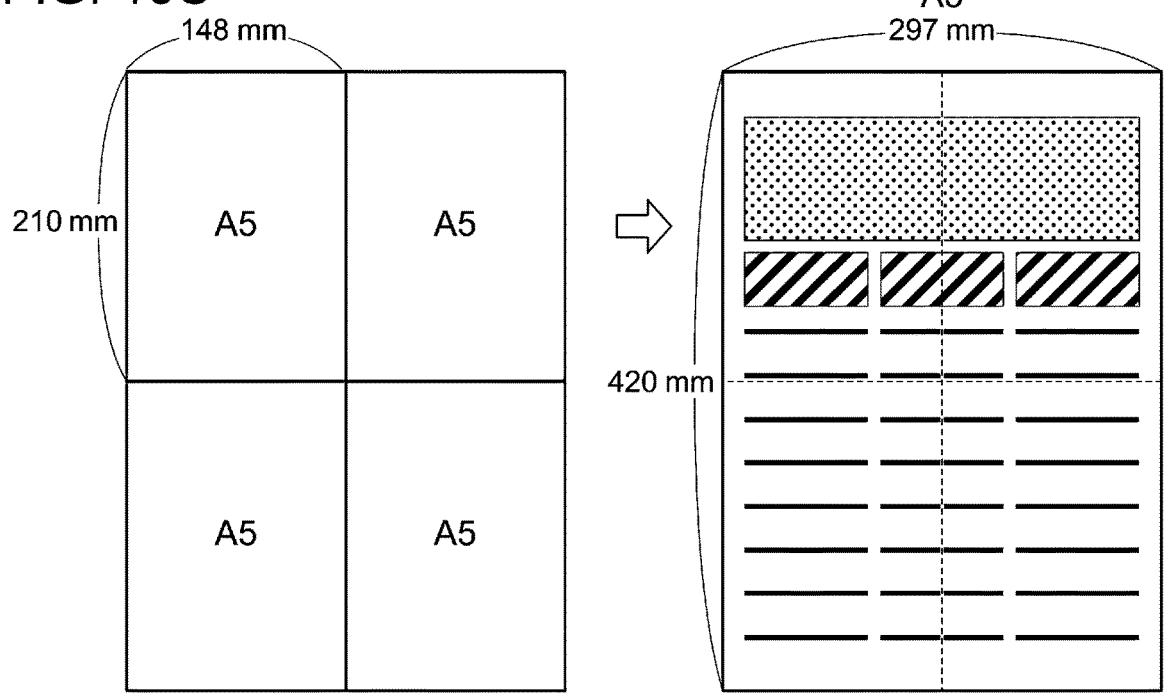

In the example discussed above, the paper size is indicated as an example of the print setting. However, the print setting is not limited to the paper size. For example, the print setting may include setting about the layout on paper. Specifically, the print setting may further include at least one of the orientation of paper to be used for printing, the imposition, and the poster layout. FIGS. 10A to 10C each illustrate a different example of print setting.

The orientation of paper to be used for printing will be described while referring to FIG. 10A. The orientation of paper to be used for printing includes the vertical direction and the horizontal direction. The width of paper to be used for printing is varied in accordance with the paper orientation. For example, in the case where printing is performed on A4 paper, the width of the paper is 210 mm as illustrated on the left side of FIG. 10A if the paper orientation is the vertical direction. On the other hand, the width of the paper is 297 mm as illustrated on the right side of FIG. 10A if the paper orientation is the horizontal direction. In the correlation table, the terminal information is varied in accordance with the width of the paper. Therefore, design of the Web page to be printed as printed matter may be varied as illustrated in FIG. 10A.

The imposition will be described while referring to FIG. 10B. The term "imposition" generally refers to arranging data on a plurality of pages on one sheet of paper in the course of bookbinding. It should be noted, however, that the imposition according to the present exemplary embodiment is not limited to being premised on bookbinding. The imposition according to the present exemplary embodiment also involves a plurality of pages to be collectively output to one sheet of paper, rather than being subjected to bookbinding.

In the example illustrated in FIG. 10B, data on two pages are arranged on one sheet of paper in the case where printing is performed on A4 paper. In this case, a Web page is printed in each of the right and left regions, and the width of the paper is considered to be half the width of A4 paper which is 297 mm, that is, the width (i.e. 148 mm) of A5 paper. Thus, printing is performed using the terminal information corresponding to the width of A5 paper in the correlation table.

The poster layout will be described while referring to FIG. 10C. The term "poster layout" refers to the function of dividing data on one page into a plurality of sheets of paper to be printed. In the example illustrated in FIG. 10C, a Web page is printed using four sheets (two sheets arranged vertically and two sheets arranged horizontally) of A5 paper as illustrated on the left side of the drawing. In this case, as illustrated on the right side of the drawing, the four sheets of A5 paper on which printing has been performed are combined with each other to obtain a large sheet of A3 paper as a whole. Thus, printing is performed using the terminal information corresponding to the width (i.e. 297 mm) of A3 paper in the correlation table.

Incidentally, in the case where the print setting includes the paper orientation, a plurality of combinations of the paper size and the paper orientation are set in the correlation table. Each of the plurality of combinations is correlated with the terminal information. For example, the same terminal information is correlated with the width (297 mm) of A3 paper for a case where the paper orientation is the vertical direction and the width (297 mm) of A4 paper for a case where the paper orientation is the horizontal direction.

Similarly, in the case where the print setting includes the imposition, a plurality of combinations of the paper size and the imposition are set in the correlation table. Each of the plurality of combinations is correlated with the terminal information. For example, setting for arranging data on two pages on one sheet of A4 paper is correlated with the same terminal information as that for the width (148 mm) of A5 paper.

In the case where the print setting includes the poster layout, meanwhile, a plurality of combinations of the paper size and the poster layout are set in the correlation table. Each of the plurality of combinations is correlated with the terminal information. For example, setting for using four (2×2) sheets of A5 paper is correlated with the same terminal information as that for the width (297 mm) of A3 paper.

Further, combinations of two or more of the paper orientation, the imposition, and the poster layout may be set in the correlation table. For example, in the case where the print setting includes the paper orientation and the imposition, a plurality of combinations of the paper size, the paper orientation, and the imposition are set in the correlation table. Each of the plurality of combinations is correlated with the terminal information.

In this manner, print setting other than the paper size is also set in the correlation table.

It should be noted, however, that print setting other than the paper size may not be set in the correlation table. For example, the width of a region in which a Web page is to be printed is calculated on the basis of various print settings such as the paper orientation, the imposition, and the poster layout. Terminal information corresponding to the calculated width of the region may be acquired using the correlation table illustrated in FIG. 8. For example, in the case where printing is to be performed on A4 paper with the paper oriented in the horizontal direction, the width of a region in which a Web page is to be printed is calculated as 297 mm. Terminal information corresponding to 297 mm (in the example illustrated in FIG. 8, for tablet terminal, 842 px) may be acquired using the correlation table illustrated in FIG. 8.

The paper size in the print setting (i.e. the size of paper to be used for printing) may be considered as the "size of a region in which a Web page is to be printed". For example, in the case where a significantly large margin is set in the print setting, printing may be preferably performed using a design that is different from that with no margin, even in the case where the same paper is used. Thus, in the case where a margin is set in the print setting, for example, the size of paper with the margin removed may be considered as the paper size, and terminal information may be specified on the basis of the paper size and the paper width.

Other Configuration Examples

In the example discussed above, terminal information set on the basis of the print setting is used in both a case where the Web page data requesting section 112 requests data on a Web page and a case where the Web page data interpretation section 113 processes data on a Web page. In the present exemplary embodiment, however, terminal information set on the basis of the print setting may be used in one of such cases.

For example, the Web page data requesting section 112 requests data on a Web page using terminal information set on the basis of the print setting. On the other hand, the Web page data interpretation section 113 may process data on a Web page using terminal information determined in advance (e.g. a User-Agent based on the connection terminal 100 and the display width of a display region displayed on the screen), rather than terminal information set on the basis of the print setting.

Alternatively, the Web page data requesting section 112 requests data on a Web page using terminal information determined in advance (e.g. a User-Agent based on the connection terminal 100), for example. On the other hand, the Web page data interpretation section 113 may process data on a Web page using terminal information set on the basis of the print setting.

In addition, the user may select to use terminal information set on the basis of the print setting. For example, the user selects to use terminal information set on the basis of the print setting in the case where the Web page data requesting section 112 requests data on a Web page. Alternatively, the user may select to use terminal information set on the basis of the print setting in both a case where the Web page data requesting section 112 requests data on a Web page and a case where the Web page data interpretation section 113 processes data on a Web page, for example.

Further, the user may select what piece of terminal information set on the basis of the print setting to use. For example, the user selects to use a User-Agent set on the basis of the print setting. In this case, a User-Agent obtained on the basis of the correlation table is used in processes in which a User-Agent is utilized. Alternatively, the user may select to use a User-Agent and a display width set on the basis of the print setting, for example. In this case, a User-Agent obtained on the basis of the correlation table is used in processes in which a User-Agent is utilized, and a display width obtained on the basis of the correlation table is used in processes in which a display width is utilized.

In addition, in the example discussed above, a Web page is printed after the Web page is displayed on the display mechanism 106 of the connection terminal 100. In the present exemplary embodiment, however, a Web page may not be displayed before printing the Web page. For example, the user may designate a Web page to be printed with the Web page to be printed not displayed.

The programs for implementing the exemplary embodiment of the present disclosure may be not only provided by a communication unit but also provided as stored in a recording medium such as a CD-ROM.

While a variety of exemplary embodiments and modifications have been described above, it is a matter of course that such exemplary embodiments and modifications may be combined with each other.

In addition, the present disclosure is not limited to the exemplary embodiment described above in any way, and may be implemented in a variety of forms without departing from the scope and spirit of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
 a processor configured to:
  receive a print setting for a Web page from an operator;
  request data on the Web page by transmitting terminal information set on a basis of the print setting to a Web server that provides the data on the Web page; and
  generate print data on a basis of the data on the Web page obtained from the Web server, wherein
 the processor generates the print data using different terminal information set on the basis of the print setting together with the data on the Web page obtained from the Web server.

2. The information processing apparatus according to claim 1,
 wherein the different terminal information includes a width of a display region in which the Web page is to be displayed, and the width of the display region is set to be larger as a width of paper in the print setting is larger.

3. The information processing apparatus according to claim 2,
 wherein the print setting includes a size of paper to be used for printing, and
 the processor transmits the terminal information corresponding to the received print setting to the Web server using a correlation that correlates each of a plurality of sizes of the paper and the terminal information.

4. The information processing apparatus according to claim 3,
 wherein the print setting further includes at least one of an orientation of the paper to be used for printing and an imposition, and
 the correlation correlates each of combinations of the plurality of sizes of the paper and the orientation of the paper or the imposition.

5. The information processing apparatus according to claim 4,
 wherein the correlation correlates each of the plurality of sizes of the paper and the terminal information and the different terminal information.

6. The information processing apparatus according to claim 3,
wherein the correlation correlates each of the plurality of sizes of the paper and the terminal information and the different terminal information.

7. The information processing apparatus according to claim 1,
wherein the print setting includes a size of paper to be used for printing, and
the processor transmits the terminal information corresponding to the received print setting to the Web server using a correlation that correlates each of a plurality of sizes of the paper and the terminal information.

8. The information processing apparatus according to claim 7,
wherein the print setting further includes at least one of an orientation of the paper to be used for printing and an imposition, and
the correlation correlates each of combinations of the plurality of sizes of the paper and the orientation of the paper or the imposition.

9. The information processing apparatus according to claim 8,
wherein the correlation correlates each of the plurality of sizes of the paper and the terminal information and the different terminal information.

10. The information processing apparatus according to claim 7,
wherein the correlation correlates first paper and first terminal information, and correlates second paper, which is smaller than the first paper, and second terminal information, and
the first terminal information is terminal information that indicates a terminal with a screen that is larger than a screen of a mobile terminal, and the second terminal information is terminal information that indicates the mobile terminal.

11. A non-transitory computer readable medium storing a program causing a computer to execute a process comprising:
receiving a print setting for a Web page from an operator;
requesting data on the Web page by transmitting terminal information set on a basis of the print setting to a Web server that provides the data on the Web page; and
generating print data on a basis of the data on the Web page obtained from the Web server in response to a request, wherein
the print data is generated using different terminal information set on the basis of the print setting together with the data on the Web page obtained from the Web server.

* * * * *